United States Patent [19]
Sharp

[11] Patent Number: 5,667,346
[45] Date of Patent: Sep. 16, 1997

[54] DIRECT TENSION INDICATOR WASHER

[75] Inventor: David L. Sharp, New York, N.Y.

[73] Assignee: F. Jonathan M. Turner, Philadelphia, Pa.

[21] Appl. No.: 597,606

[22] Filed: Feb. 6, 1996

[51] Int. Cl.⁶ .................................................. F16B 31/02
[52] U.S. Cl. ........................ 411/10; 411/5; 411/14
[58] Field of Search ........................ 411/5, 9, 10, 11, 411/14; 116/DIG. 34

[56] References Cited

U.S. PATENT DOCUMENTS

| | | |
|---|---|---|
| 2,570,863 | 10/1951 | Rowe . |
| 3,187,621 | 6/1965 | Turner ........................ 411/10 |
| 3,285,120 | 11/1966 | Kartiala . |
| 3,512,447 | 5/1970 | Vaughn . |
| 3,534,651 | 10/1970 | Belfiglio . |
| 3,890,876 | 6/1975 | Dahl . |
| 4,020,734 | 5/1977 | Bell . |
| 4,518,295 | 5/1985 | Matuschek . |
| 4,692,076 | 9/1987 | Herb . |
| 4,773,272 | 9/1988 | Trungold . |
| 4,887,948 | 12/1989 | Calmettes . |
| 4,889,457 | 12/1989 | Hageman . |
| 5,015,132 | 5/1991 | Turner et al. ........................ 411/5 X |
| 5,370,483 | 12/1994 | Hood et al. ........................ 411/10 |
| 5,487,632 | 1/1996 | Hood et al. . |

FOREIGN PATENT DOCUMENTS

| | | |
|---|---|---|
| 0 100 555 | 2/1984 | European Pat. Off. . |
| 2 403 484 | 4/1979 | France . |
| 2 425 575 | 12/1979 | France . |
| 1 023 639 | 1/1958 | Germany . |
| 1 006 452 | 10/1965 | United Kingdom . |
| 1 116 948 | 6/1968 | United Kingdom . |
| 1 144 080 | 3/1969 | United Kingdom . |
| 2107018 | 4/1983 | United Kingdom ........................ 411/10 |
| 2 263 745 | 8/1993 | United Kingdom . |

*Primary Examiner*—Neill R. Wilson
*Attorney, Agent, or Firm*—Ratner & Prestia

[57] ABSTRACT

A pre-load indicating washer for properly tensioning a joint held together by an externally threaded member and an internally threaded member. The pre-load indicating washer has a plurality of protuberances, struck and partially sheared from the annular body of the washer, which are pushed under load back into a corresponding number of indentations in the annular body which are formed when the protuberances are formed. The protuberances of the pre-load indicating washer are curved in outline with no portion of the protuberances extending radially outward beyond the outer periphery of the bearing surface of an externally threaded member when the pre-load indicating washer is positioned adjacent the externally threaded member, or radially outward beyond the outer periphery of the bearing surface of an internally threaded member when the pre-load indicating washer is positioned adjacent the internally threaded member.

19 Claims, 3 Drawing Sheets

DIRECT TENSION INDICATOR WASHER

TECHNICAL FIELD

The present invention relates, in general, to the installation of fasteners and, in particular, to a pre-load indicating washer for use with a fastener which enables the desired tension of the fastener to be achieved during installation of the fastener in a joint.

BACKGROUND OF THE INVENTION

It is well known to those skilled in the art that the most accurate way to install tension into fasteners in a joint is to control tightening by developing an indication of the tension in the fastener either directly from the fastener or another component used with the fastener. Fastener installation based on torque control can result in wide variations in the tension in the fastener because of variations in fastener lubricity, burrs on the thread of threaded fasteners, and variations in the friction at the surface of the joint component against which the bearing surface of a threaded fastener bears.

U.S. Pat. No. 3,187,621 is directed to a pre-load indicating washer adapted for use with a threaded fastener and intended to develop an indication of proper tensioning of the fastener. This pre-load indicating washer has a plurality of protuberances which are struck and partially sheared from an annular body to leave indentations in the annular body. With this pre-load indicating washer in a joint, the protuberances are pushed back into the indentations in the annular body as the joint is tightened and tightening is stopped when the protuberances have been "collapsed" back into the indentations in the annular body a prescribed amount. This condition, typically, is sensed by a "feeler" gage inserted into a gap in the joint. U.S. Pat. No. 5,015,132, U.S. Pat. No. 5,370,483, and U.S. Pat. No. 5,487,632 also are directed to this type of pre-load indicating washer.

If the protuberances of this pre-load indicating washer extend beyond the bearing surface of the fastener with which it is used, as is the case with straight-sided protuberances and fasteners having comparatively smaller bearing surfaces, the protuberances will not be collapsed back into the indentations in the annular body of the washer properly. Instead of the load being applied over the entire lengths of the protuberances, it is applied only over those portions of the protuberances which are in contact with the bearing surface of the fastener. As a result, some portions of the protuberances are not collapsed back into the indentations leading to erroneous indications of the tension of the fastener. The use of such pre-load indicating washers with fasteners having comparatively smaller bearing surfaces has not been practical.

SUMMARY OF THE INVENTION

A pre-load indicating washer, constructed in accordance with the present invention, includes an annular body and a plurality of protuberances integral with the annular body struck and partially sheared from the annular body to project from a first face of the annular body and leave a corresponding plurality of indentations in a second face of the annular body opposite from the first face. Each of the protuberances is curved in outline and defined by a pair of outer side walls extending away from the first face of the annular body and an outer surface extending between the pair of outer side walls and between two spaced regions of the first face of the annular body. Each of the indentations is curved in outline and defined by a pair of inner side walls extending through the annular body from the second face of the annular body and from which a pair of outer side walls of one of the protuberances has been sheared and an inner surface extending between the pair of inner side walls and between two spaced regions of the second face of the annular body and between two spaced regions of the second face of the annular body.

DESCRIPTION OF THE PRIOR ART

Figure 1:
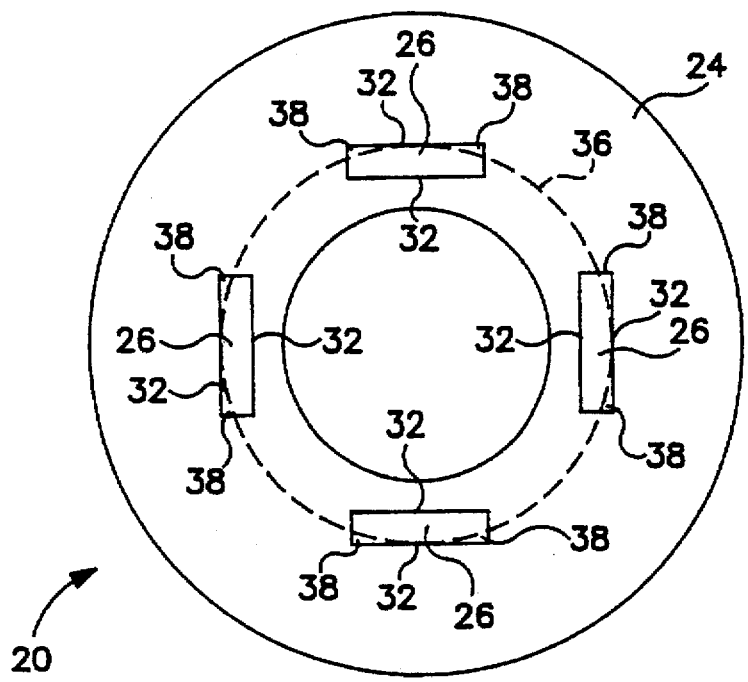
FIG. 1 is a plan view of a first face of a prior art pre-load indicating washer.

U.S. Pat. No. 3,187,621, U.S. Pat. No. 5,015,132, U.S. Pat. No. 5,370,483, and U.S. Pat. No. 5,487,632 are incorporated by reference as if their entire contents were fully set forth herein. FIG. 1 of this application, identified as "PRIOR ART," represents one face of the prior art pre-load indicating washers to which U.S. Pat. No. 3,187,621, U.S. Pat. No. 5,015,132, U.S. Pat. No. 5,370,483, and U.S. Pat. No. 5,487,632 are directed.

Figure 2:
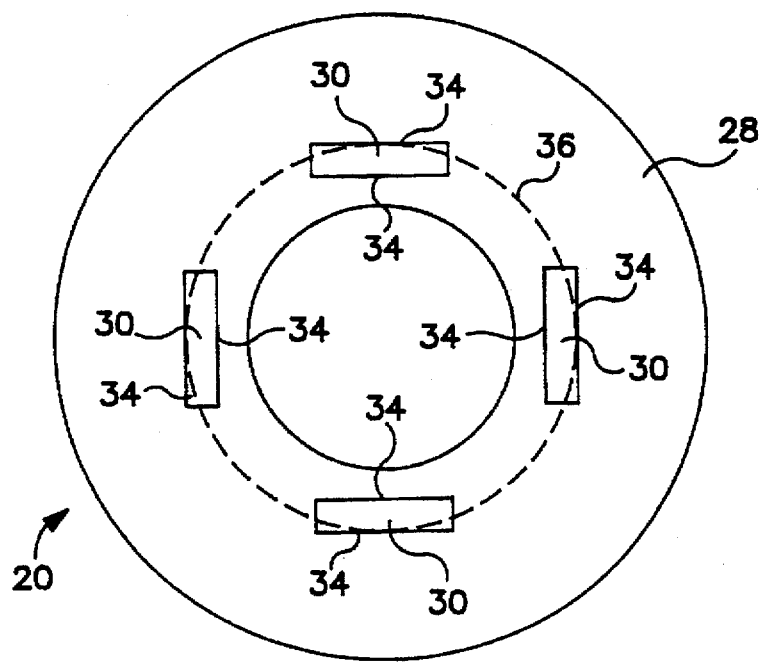
FIG. 2 is a plan view of a second face, opposite from the first face, of a prior an pre-load indicating washer.

Referring to FIGS. 1 and 2, the pre-load indicating washer comprises an annular body 20 which has on a first face 24 a plurality of protuberances 26 which are formed by displacement of metal as a result of indenting a second face 28 to partially shear the metal and form a corresponding plurality of indentations 30 in face 28. Protuberances 26 and indentations 30 have outer side walls 32 and inner side walls 34, respectively. When this pre-load indicating washer is used in a joint, protuberances 26 are "collapsed" back into indentations 30 in annular body 20 as the joint is tightened.

Dashed line 36 in FIG. 1 represents a bolt head or nut bearing surface. As can be seen, when portions of protuberances 26, such as end portions 38, extend radially outward beyond the outer periphery of the bolt head bearing surface or the nut bearing surface, these portions of the protuberances are not collapsed back into indentations 30 in annular body 20 as the joint is tightened, thereby affecting the ease of collapse of the protuberances which, in turn, can result in inaccurate indications of the loading of the joint in which the pre-load indicating washer has been included.

DETAILED DESCRIPTION OF THE INVENTION

Figure 3:
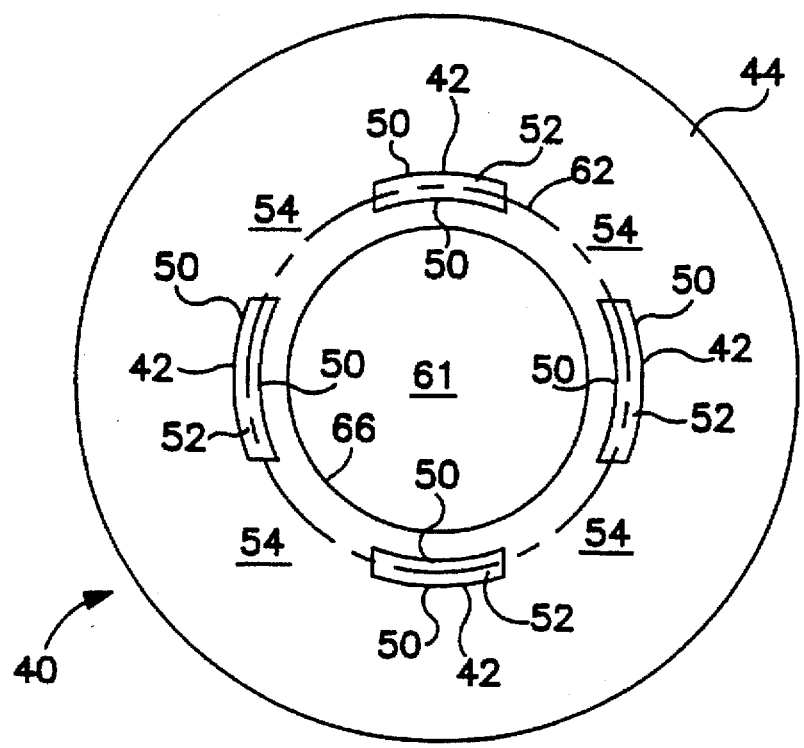
FIG. 3 is a plan view of one face of a pre-load indicating washer constructed in accordance with the present invention.
Figure 4:
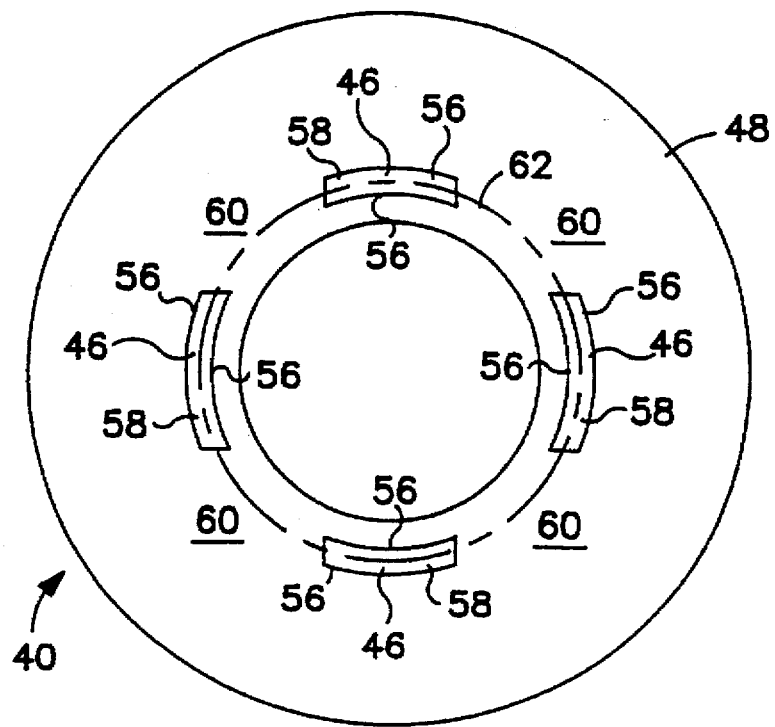
FIG. 4 is a plan view of a second face, opposite from the first face, of a pre-load indicating washer constructed in accordance with the present invention.

Referring to FIGS. 3 and 4, a pre-load indicating washer, constructed in accordance with the present invention, includes an annular body 40 and a plurality of protuberances 42 integral with the annular body struck and partially sheared from the annular body to project from a first face 44 of the annular body and leave a corresponding plurality of indentations 46 in a second face 48 of the annular body opposite from the first face. Each protuberance 42 is defined by a pair of outer side walls 50 extending away from face 44 of annular body 40 and an outer surface 52 extending between the pair of outer side walls and between two spaced regions 54 of face 44 of the annular body. Each indentation 46 is defined by a pair of inner side walls 56 extending through annular body 40 from face 48 of the annular body and from which a pair of outer side walls of one of the protuberances has been sheared and an inner surface 58 extending between the pair of inner side walls and between two spaced regions 60 of face 48 of the annular body.

In contrast to the protuberances and indentations in the prior art pre-load indicating washers of this type which are straight in outline, each protuberance 42 and each indentation 46 is curved in outline in accordance with the present invention. The radially outermost points of protuberances 42 and the radially outermost points of indentations 46 lie on a circle having a center at the center 61 of annular body 40. Protuberances 42 and indentations 46 are spaced apart by equal arc lengths. For the embodiment of the invention illustrated in FIGS. 3 and 4, there are four protuberance/indentation pairs spaced apart by ninety degrees.

Preferably, protuberances 42 and indentations 46 extend along a circle, shown by dot-dash line 62, having a center at the center 61 of annular body 40. The centers of curvature of the protuberance/indentation pairs need not be at the center 61 of annular body 40. Instead, each protuberance/indentation pair can have a distinct center of curvature with a radius of curvature which is greater or less than the radius of circle 62. All that is required is that no portions of protuberances 42 extend radially outward beyond the outer periphery of the bearing surface of an externally threaded member when the pre-load indicating washer is positioned adjacent the externally threaded member, or radially outward beyond the outer periphery of the bearing surface of an internally threaded member when the pre-load indicating washer is positioned adjacent the internally threaded member. The radially outermost outer side walls 50 of protuberances 42 and the radially outermost inner side walls 56 of indentations 46 represent the outer periphery of the bearing surface of an externally threaded member when the pre-load indicating washer is positioned adjacent the externally threaded member, or the outer periphery of the bearing surface of an internally threaded member when the pre-load indicating washer is positioned adjacent the internally threaded member. With a pre-load indicating washer having a circular inner periphery 66, which is the usual configuration of such parts, and with protuberances 42 and indentations 46 extending along a circle 62 having a center at the center 61 of annular body 40, the protuberance/indentation pairs extend along a circle which is concentric with the circular inner periphery of the annular body.

Figure 5:
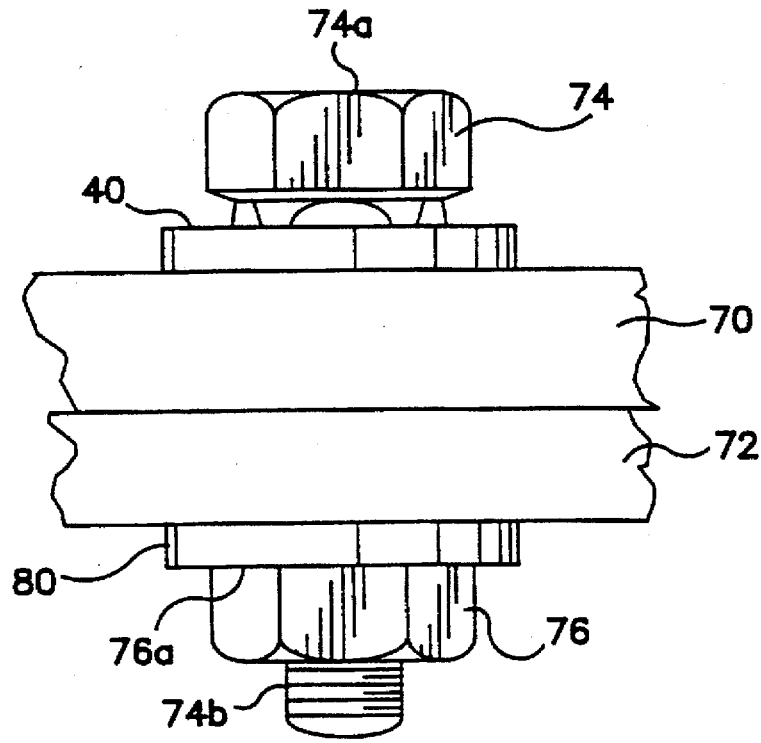
FIG. 5 is an elevation view of a joint assembly in which a pre-load indicating washer, constructed in accordance with the present invention, can be used prior to tightening.
Figure 6:
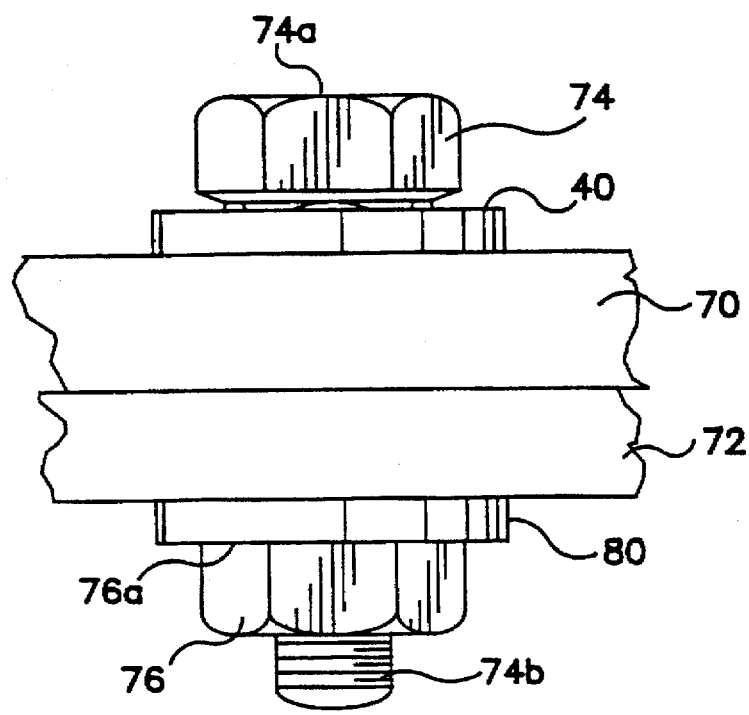
FIG. 6 is similar to FIG. 4 but shows the joint assembly after tightening.

The use of a pre-load indicating washer, constructed in accordance with the present invention, is illustrated in FIGS. 5 and 6. A joint assembly, comprising a pair of joint members 70 and 72, an externally threaded member in the form of a bolt 74, an internally threaded member in the form of a nut 76, and a standard washer 80, is assembled with the proper tension in the bolt by use of pre-load indicating washer 40. Bolt 74 has a head 74a and a threaded shank 74b which extends through joint members 70 and 72.

Pre-load indicating washer 40 is disposed somewhere between head 74a of bolt 74 and bearing surface 76a of nut 76 which is in threaded engagement with the point end of threaded shank 74b of the bolt at the opposite end of the bolt. For the particular arrangement illustrated in FIGS. 5 and 6, pre-load indicating washer 40 is positioned adjacent head 74a of bolt 74 with the underside bearing surface of the bolt head bearing against the tops of the protuberances of pre-load indicating washer 40. Nut 76 is driven and bolt 74 is held. Washer 80 isolates the turning of nut 80 from joint member 72. When bolt 74 is driven and nut 76 is held, pre-load indicating washer 40 is positioned adjacent bearing surface 76a of nut 76 with the bearing surface of the nut bearing against the tops of the protuberances of the pre-load indicating washer. Washer 80 then is positioned between bolt head 74a and joint member 70 to isolate the turning of bolt 74 from joint member 72. With pre-load indicating washer 40 positioned adjacent bolt 74, no portions of the protuberances of the pre-load indicating washer extend radially outward beyond the outer periphery of the bearing surface of bolt head 74a and with the pre-load indicating washer positioned adjacent nut 76, no portions of the protuberances of the pre-load indicating washer extend radially outward beyond the outer periphery of bearing surface 76a.

Pre-load indicating washer 40 is subjected to the clamping load between bolt 74 and nut 76 as the joint is assembled and tightened either by driving bolt 74 or nut 76. As the tightening proceeds, the protuberances of the pre-load indicating washer collapse back into their associated indentations and, for the example illustrated by FIGS. 5 and 6, the gap between the top surface of the pre-load indicating washer and the underside bearing surface of the bolt head is reduced. When this gap has been reduced a prescribed amount, as measured by a "feeler" gage, the tightening is stopped because the gap represents proper tensioning of bolt 74. This is because the number and size of the protuberances have been selected with respect to the compressive force applied by the nut and the bolt, so that the protuberances will plastically deform into the annular body when the compressive force applied to the pre-load indicating washer has reached the desired tension in the bolt.

It should be noted that the features of the pre-load indicating washers to which U.S. Pat. No. 5,015,132, U.S. Pat. No. 5,370,483, and U.S. 5,487,632 are directed can be incorporated in a pre-load indicating washer constructed in accordance with the present invention.

While there have been described preferred embodiments of the present invention, it should be obvious to those skilled in the art that various modifications and changes can be made without departing from the true spirit and scope of the invention.

What is claimed:

1. A pre-load indicating washer comprising an annular body and a plurality of protuberances integral with said annular body struck and partially sheared from said annular body to project from a first face of said annular body and leave a corresponding plurality of indentations in a second face of said annular body opposite from said first face, each of said protuberances being curved in outline and defined by:

(a) a pair of outer side walls extending away from said first face of said annular body, and
   (b) an outer surface extending between said pair of outer side walls and between two spaced regions of said first face of said annular body, and each of said indentations being curved in outline and defined by:

(a) a pair of inner side walls extending through said annular body from said second face of said annular body and from which a pair of outer side walls of one of said protuberances has been sheared, and
   (b) an inner surface extending between said pair of inner side walls and between two spaced regions of said second face of said annular body.

2. A pre-load indicating washer according to claim 1 wherein the radially outermost points of said protuberances and the radially outermost points of said indentations lie on a circle having a center at the center of said annular body.

3. A pre-load indicating washer according to claim 2 wherein said protuberances and said indentations are spaced apart by equal arc lengths.

4. A pre-load indicating washer according to claim 1 wherein said protuberances and said indentations extend along a circle having a center at the center of said annular body.

5. A pre-load indicating washer according to claim 4 wherein said protuberances and said indentations are spaced apart by equal arc lengths.

6. A pre-load indicating washer according to claim 1 wherein said annular body has a circular inner periphery.

7. A pre-load indicating washer according to claim 6 wherein said protuberances and said indentations extend along a circle concentric with said circular inner periphery of said annular body.

8. A pre-load indicating washer according to claim 7 wherein said protuberances and said indentations are spaced apart by equal arc lengths.

9. A joint assembly comprising:

at least one joint member;

an externally threaded member having a bearing surface;

an internally threaded member having a bearing surface in threaded engagement with an end of said externally threaded member;

and a pre-load indicating washer disposed between said internally threaded member and an opposite end of said externally threaded member and comprising an annular body and a plurality of protuberances integral with said annular body struck and partially sheared from said annular body to project from a first face of said annular body and leave a corresponding plurality of indentations in a second face of said annular body opposite from said first face, each of said protuberances being curved in outline with no portion of said protuberances extending:

(a) radially outward beyond the outer periphery of said bearing surface of said externally threaded member when said pre-load indicating washer is positioned adjacent said externally threaded member, and (b) radially outward beyond the outer periphery of said bearing surface of said internally threaded member when said pre-load indicating washer is positioned adjacent said internally threaded member, and each of said protuberances defined by:

(a) a pair of outer side walls extending away from said first face of said annular body, and (b) an outer surface extending between said pair of outer side walls and between two spaced regions of said first face of said annular body, and each of said indentations being curved in outline and defined by:

(a) a pair of inner side walls extending through said annular body from said second face of said annular body and from which a pair of outer side walls of one of said protuberances has been sheared, and (b) an inner surface extending between said pair of inner side walls and between two spaced regions of said second face of said annular body.

10. A joint assembly according to claim 9 wherein said joint assembly includes a pair of joint members, said externally threaded member is a bolt extending through said pair of joint members and having a head and a threaded shank, and said internally threaded member is a nut in threaded engagement with said threaded shank of said bolt.

11. A joint assembly according to claim 10 wherein said pre-load indicating washer is positioned against said head of said bolt with said protuberances bearing against said head of said bolt.

12. A joint assembly according to claim 9 wherein the radially outermost points of said protuberances and the radially outermost points of said indentations lie on a circle having a center at the center of said annular body.

13. A joint assembly according to claim 12 wherein said protuberances and said indentations are spaced apart by equal arc lengths.

14. A joint assembly according to claim 9 wherein said protuberances and said indentations extend along a circle having a center at the center of said annular body.

15. A joint assembly according to claim 14 wherein said protuberances and said indentations are spaced apart by equal arc lengths.

16. A joint assembly according to claim 9 wherein said annular body has a circular inner periphery.

17. A joint assembly according to claim 16 wherein said protuberances and said indentations extend along a circle concentric with said circular inner periphery of said annular body.

18. A joint assembly according to claim 17 wherein said protuberances and said indentations are spaced apart by equal arc lengths.

19. A pre-load indicating washer according to claim 1 wherein said protuberances are positioned on said first surface with no portion of said protuberances extending radially outward beyond the outer periphery of the bearing surface of a fastener with which said washer is intended to be used.

* * * * *